United States Patent
Liu

(10) Patent No.: US 9,058,952 B2
(45) Date of Patent: Jun. 16, 2015

(54) INTELLIGENT MAGNETIC LATCHING MINIATURE CIRCUIT BREAKER

(71) Applicant: Zhenyang Liu, Nanjing (CN)

(72) Inventor: Zhenyang Liu, Nanjing (CN)

(73) Assignee: Zhenyang Liu, Nanjin, Jiangsu (CN)

( * ) Notice: Subject to any disclaimer, the term of this patent is extended or adjusted under 35 U.S.C. 154(b) by 0 days.

(21) Appl. No.: 14/129,292

(22) PCT Filed: Dec. 13, 2012

(86) PCT No.: PCT/CN2012/001693
§ 371 (c)(1),
(2) Date: Dec. 26, 2013

(87) PCT Pub. No.: WO2013/097287
PCT Pub. Date: Jul. 4, 2013

(65) Prior Publication Data
US 2014/0301006 A1    Oct. 9, 2014

(30) Foreign Application Priority Data
Dec. 26, 2011  (CN) .......................... 2011 1 0441856

(51) Int. Cl.
| H01H 73/00 | (2006.01) |
| H01H 71/24 | (2006.01) |
| H01H 71/00 | (2006.01) |
| H02H 3/10 | (2006.01) |
| H01H 75/00 | (2006.01) |
| H01H 77/00 | (2006.01) |
| H01H 75/12 | (2006.01) |
| H02H 3/08 | (2006.01) |

(52) U.S. Cl.
CPC ........... *H01H 71/2436* (2013.01); *H01H 71/00* (2013.01); *H02H 3/08* (2013.01); *H02H 3/10* (2013.01)

(58) Field of Classification Search
CPC ...................................................... H01H 77/06
USPC ......................................................... 361/115
See application file for complete search history.

(56) References Cited

U.S. PATENT DOCUMENTS

| 5,223,795 | A | * | 6/1993 | Blades ........................... 324/536 |
| 5,886,860 | A | * | 3/1999 | Chen et al. ......................... 361/9 |
| 5,926,081 | A | * | 7/1999 | DiMarco et al. ................. 335/16 |
| 2003/0210114 | A1 | * | 11/2003 | Brandon et al. ................. 335/21 |
| 2009/0206059 | A1 | * | 8/2009 | Kiko ............................. 218/143 |
| 2014/0340804 | A1 | * | 11/2014 | Ward ............................ 361/115 |

* cited by examiner

*Primary Examiner* — Dharti Patel
(74) *Attorney, Agent, or Firm* — George G. Wang; Bei & Ocean

(57) ABSTRACT

This invention discloses a type of intelligent magnetic-hold miniature circuit breaker, comprising a casing, a magnetic-hold relay, and a drive circuit, wherein said drive circuit receives control signal and then drives operation of said magnetic-hold relay; said magnetic-hold relay comprises a dynamic spring assembly, a static spring assembly, a deflector rod, a pushing piece, and a magnetic steel assembly; rotation of said magnetic steel assembly drives said deflector rod and then closing or opening of contacts of said dynamic spring assembly and said static spring assembly via said pushing piece; said miniature circuit breaker also includes a central processor, a communication chip, a mutual inductance module, and a current conditioning circuit. Said mutual inductance module is installed on the extension wire of the dynamic spring assembly. Said current conditioning circuit is connected to said central processor and said mutual inductance module respectively. Said central processor drives the magnetic-hold relay via said drive circuit according to current state signal from said current conditioning circuit, to realize overload protection.

10 Claims, 5 Drawing Sheets

INTELLIGENT MAGNETIC LATCHING MINIATURE CIRCUIT BREAKER

CROSS-REFERENCE TO RELATED APPLICATIONS

This application claims priority from CN Application No. CN201110441856.9, filed Dec. 26, 2011 and PCT Application No. PCT/CN2012/001693, filed Dec. 13, 2012, the contents of which are incorporated herein in the entirety by reference.

FIELD OF THE INVENTION

This invention relates to a type of circuit breaker, in particular an intelligent magnetic-hold miniature circuit breaker in the field of miniature circuit breaker.

BACKGROUND OF THE INVENTION

Miniature circuit breaker is a type of terminal protection electric appliance most widely used for building electric terminal power distribution devices. Miniature circuit breaker is just a type of mechanical switching electric appliance with limited functions and its normal operations are only manual. This electric appliance cannot satisfy ever higher requirements on power distribution system informatization, networking, intelligentization, and multiple functions. Development of a type of multi-function intelligent miniature circuit breaker has become the grand trend and the direction of miniature circuit breaker.

Magnetic-hold relay is a new type of relay developed in recent years. It is also a type of automatic switch. Originally, magnetic-hold relay is mainly used for electricity meters that allow prepaid charging using IC card and centralized meter reading. Although magnetic-hold relay is a type of automatic switch, it can only be applied with a matching control circuit. In particular, existing magnetic-hold relays lack overload protection function and the function of complete coordination between manual operation and automatic operation.

With advent of the age of Internet of Things, intelligent home is gradually entering ordinary households, so that development of home miniature circuit breaker of reliable performance, simple structure, easy manufacture, and low cost, satisfying habit of common people, and providing intelligent control, is urgent.

SUMMARY OF THE INVENTIONS

This invention is aimed to overcome aforesaid technical disadvantages of prior art and provide a type of intelligent magnetic-hold miniature circuit breaker and its control method with integrated manual/automatic operations, overload protection, and metering function, meeting low voltage one-pole (1P) miniature circuit breaker outline standard.

Technical Scheme of this Invention

A type of intelligent magnetic-hold miniature circuit breaker, comprising a casing, a magnetic-hold relay, and a drive circuit, wherein said drive circuit receives control signal and then drives operation of said magnetic-hold relay; said magnetic-hold relay comprises a dynamic spring assembly, a static spring assembly, a deflector rod, a pushing piece, and a magnetic steel assembly; rotation of said magnetic steel assembly drives said deflector rod and then closing or opening of contacts of said dynamic spring assembly and said static spring assembly via said pushing piece; wherein said miniature circuit breaker also includes a central processor, a communication chip, a mutual inductance module, and a current conditioning circuit; said communication chip is connected to said central processor, used for information interaction between said central processor and outside; said central processor is connected to said drive circuit to transmit control signal to said drive circuit; said mutual inductance module is installed on the extension wire of the dynamic spring assembly; said current conditioning circuit is connected to said central processor and said mutual inductance module respectively; and said central processor drives the magnetic-hold relay via said drive circuit according to current state signal from said current conditioning circuit, to realize overload protection.

Said mutual inductance module can be current transformer or Hall element or manganese-copper resistor.

Said current conditioning circuit adopts a resistance network to process output current signal of said mutual inductance module to ADC voltage signal input of said central processor. Central processor complete with ADC is used to process voltage signal of current conditioning circuit to obtain effective current data. Said central processor acquires effective current data in real-time, for realization of overload protection and short circuit protection.

Said miniature circuit breaker also includes a voltage state circuit, one end of which is connected to the extension wire of said dynamic spring assembly and the other end of which is connected to said central processor, used to transmit operating state signal of said magnetic-hold relay to said central processor; and said deflector rod extends out through a hole on said casing to allow manual operation.

Said operating state signal is a voltage signal, and said voltage state circuit comprises two resistors and one convertor; wherein one end of the first resistor is connected to the live wire of commercial power supply and the other end is connected to the second resistor and the input end of said convertor, and the other end of said second resistor is earthed; wherein the output end of said convertor is connected to said central processor and said convertor converts the voltage generated by voltage division of said two resistors to the input voltage of said central processor.

Said convertor comprises three resistors and one triode; wherein one end of the first resistor is used as the input end and the other end is connected to the second resistor and base of said triode, and the other end of said second resistor is earthed; wherein emitter of said triode is connected to one end of the third resistor and used as output end of said convertor, collector of said triode is earthed, and the other end of said third resistor is connected to convertor power supply.

Said second resistor and said triode in said convertor can be replaced by optic couplers for isolation between strong power source and the central processor.

A power supply module is provided to supply power to circuit or module in said casing. Said power supply module comprises a capacitor step-down module, a full wave rectification module, a filtering module, and a voltage stabilization module; said capacitor step-down module realizes connection to live wire via current limiting; and said full wave rectification module can increase the current to reduce volume of the HV capacitor in said capacitor step-down module.

The magnetic-hold relay is the critical component of this invention. In existing mature technology, rated current of magnetic-hold relay is 80 A, but its outline does not satisfy requirements by this invention. It is necessary to design parts of magnetic-hold relay and casing internal structure to an integral assembly to satisfy casing outline fully compatible with low voltage one pole (1P) miniature circuit breaker outline standard. Miniature circuit breaker standard (GB10963.1-2005) clearly specifies required indices on contact breaking capacity and experiment code, while indices of contact breaking capacity required by magnetic-hold relay standard (JB/T10923-2010) are lower than those specified by the miniature circuit breaker standard. Therefore, based on existing magnetic-hold relay standard, overload protection adopted for this invention can only be realized by complementation using an electronic control part, with hardware circuits simplified by software. Although open state and closed state of contact of magnetic-hold relay are maintained by the magnetic force generated by a permanent magnet at other times, for opening or closing of this contact, just use positive or negative DC pulse voltage to energize the coil, so that this relay can convert open state and closed state in an instant. However, since the DC pulse voltage is 9V (7.5V-13.5V), its current is 100 mA and its pulse width is 80-100 ms, this invention needs to design power supply satisfying requirements in a limited space. The difficulty of design of the electronic part is miniaturization: while metering part and central processor can be miniaturized by chip type selection, power supply cannot be miniaturized by type selection, and innovative design is required to this end.

Compared with prior art, this invention adopts miniature circuit breaker outline standard and directly assembles the magnetic-hold relay of rated current of 80 A inside the casing of this intelligent magnetic-hold miniature circuit breaker, not only improving resistance to interference between strong power source part and weak power source part, but also effectively saving space inside casing of this miniature circuit breaker. This invention breaks through the mechanical switching mode of miniature circuit breakers, and replaces mechanical switch by magnetic-hold relay technique. Through integrated design of casing and magnetic-hold relay, space is reserved for installation of the electronic part.

In terms of functions, this invention realizes manual and remote opening and closing of line in normal state and protections (overload protection and short circuit protection) in abnormal state. Circuit breaker status can be acquired remotely. As expanded function, metering can be realized and metering data can be acquired remotely.

This invention provides high precision metering function to allow understanding of electric appliance energy consumption at any moment to facilitate energy saving. In case of fault in the line resulting in short circuit, this device can automatically open to realize overload protection. Its remote control function can control electric appliance in many modes.

This invention breaks through traditional miniature circuit breaker design concept and integrates magnetic-hold relay, central processor, current transformer, metering chip, and communication chip inside the casing of said miniature circuit breaker, so that this circuit breaker features protection, metering, control, and communication functions, realizing a type of highly intelligent magnetic-hold miniature circuit breaker truly satisfying multi-function and intelligent requirements on miniature circuit breaker.

DETAILED DESCRIPTION OF PARTICULAR EMBODIMENTS OF THE INVENTION

Figure 1:
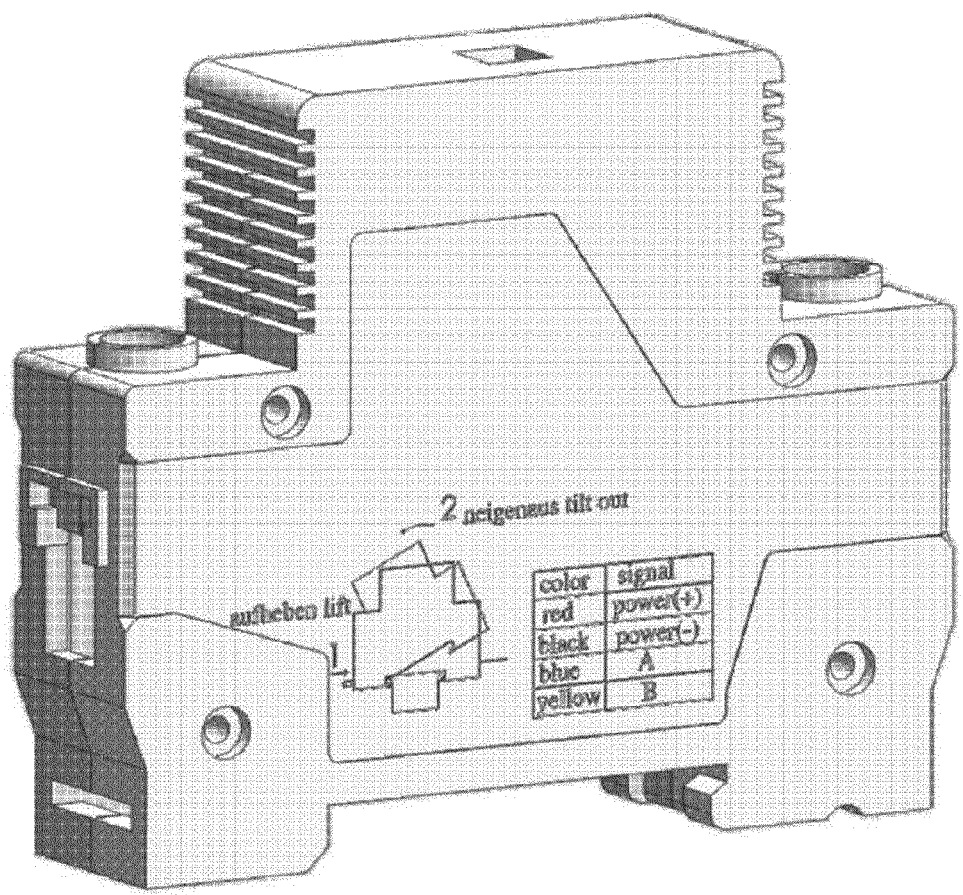
FIG. 1 is an outline of existing low voltage one pole (1P) miniature circuit breaker.

Refer to FIG. 1. The outline of this invention adopts the outline of existing low voltage one-pole (1P) miniature circuit breaker, assembled between a pedestal and an upper cover using rivets, embedded into guide rail using the mode specified by national standard GB10963, and fixed onto the guide rail using the elasticity of a snap board, realizing full compatibility with outline and installation mode of existing low voltage one-pole (1P) miniature circuit breaker.

Figure 2:
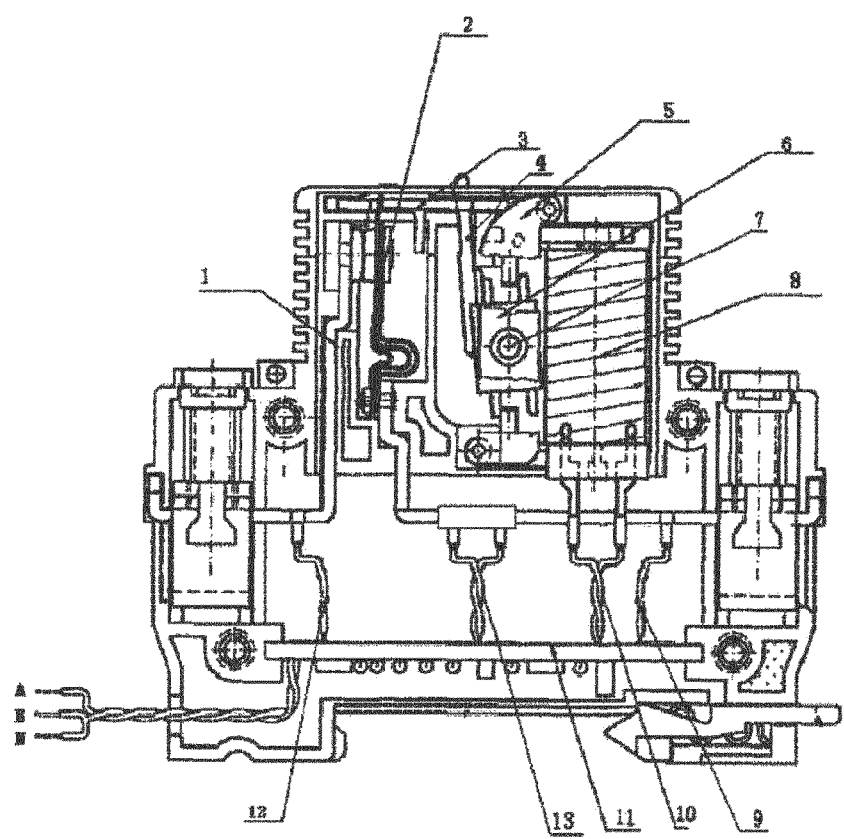
FIG. 2 is a structural schematic of this invention.
Figure 3:
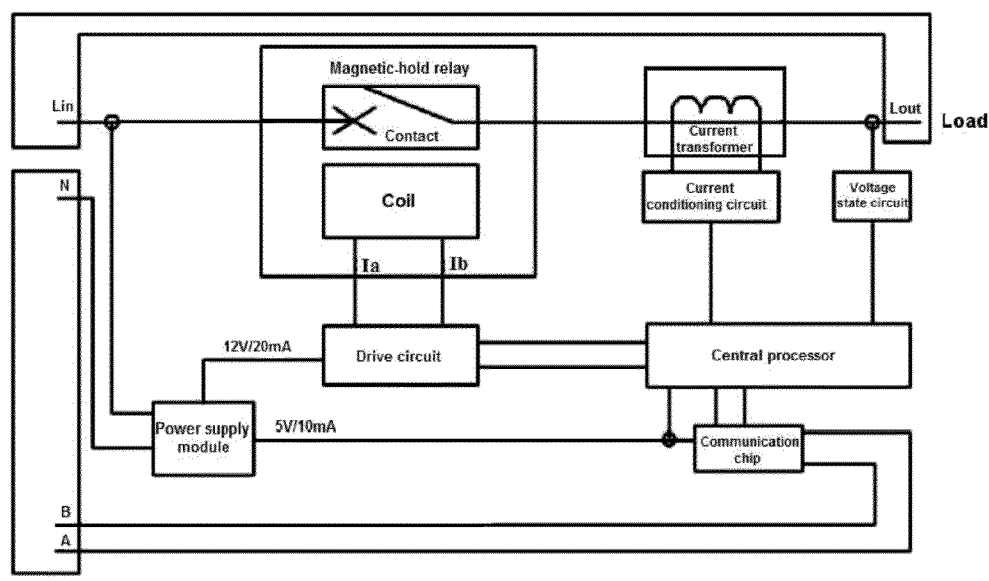
FIG. 3 is a structural block diagram of the circuits of this invention.

Refer to FIG. 2 and FIG. 3. A type of intelligent magnetic-hold miniature circuit breaker, comprising a casing, a magnetic-hold relay, and a drive circuit, wherein said drive circuit receives control signal and then drives operation of said magnetic-hold relay; said magnetic-hold relay comprises a dynamic spring assembly 2, a static spring assembly 1, a deflector rod 4, a pushing piece 3, a magnetic steel assembly 6, an iron core 8 with wound coil, a yoke iron assembly 5, and a rotating shaft 7; rotation of said magnetic steel assembly 6 drives said deflector rod 4 and then closing or opening of contacts of said dynamic spring assembly 2 and said static spring assembly 1 via said pushing piece 3; and the intelligent controller 11 comprises a central processor, a communication chip, a drive circuit, a power supply module, a voltage state circuit, a mutual inductance module, and a current conditioning circuit.

In this preferred embodiment, said mutual inductance module is a current transformer, installed on extension wire of said dynamic spring assembly via lead wire 13. Said current conditioning circuit is connected to said central processor and said mutual inductance module respectively. Said central processor drives the magnetic-hold relay via said drive circuit according to current state signal from said current conditioning circuit, to realize overload protection. said mutual inductance module can also be Hall element or manganese-copper resistor.

Said current conditioning circuit adopts a resistance network to process output current signal of said mutual inductance module to ADC voltage signal input of said central processor. Central processor complete with ADC is used to process voltage signal of current conditioning circuit to obtain effective current data. Said central processor acquires effective current data in real-time, for realization of overload protection and short circuit protection.

Said communication chip is connected to said central processor and used for information interaction between said central processor and outside; said communication chip is provided with interfaces (A, B); said central processor is connected to said drive circuit and used to transmit control signal to said drive circuit; said drive circuit is connected to said magnetic-hold relay via lead wire 10; one end of said voltage state circuit is connected to the extension wire of the dynamic spring assembly 2 via lead wire 9, and the other end is connected to said central processor, used to transmit operating state signal of said magnetic-hold relay to said central processor; and said deflector rod 4 extends out through a hole on said casing to allow manual operation; said communication chip adopts 485 chip; and said central processor adopts STC11F04E of Hoe John.

Figure 4:
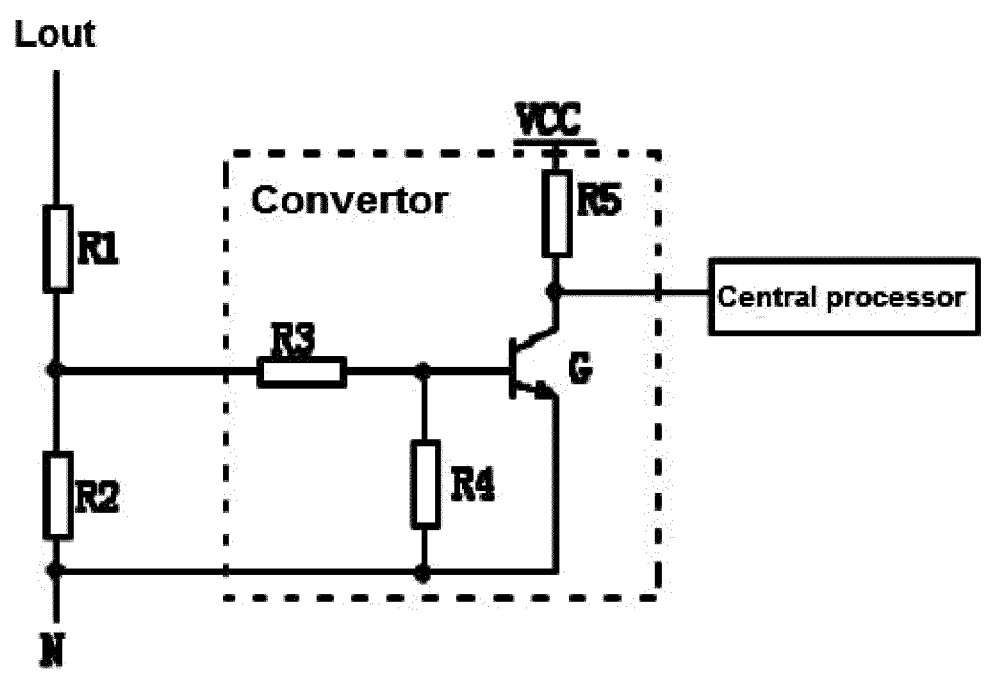
FIG. 4 is a schematic of the voltage state circuit of this invention.

Refer to FIG. 2 and FIG. 4. Said operating state signal is a voltage signal, and said voltage state circuit comprises two resistors R1, R2 and one convertor; wherein one end of the first resistor R1 is connected to the live wire Lout of commercial power supply, i.e. connected to extension wire of dynamic spring assembly 2 via lead wire 9, and the other end is connected to the second resistor R2 and the input end of said convertor, and the other end of said second resistor R2 is earthed (N); wherein the output end of said convertor is connected to said central processor and said convertor converts the voltage generated by voltage division of said two resistors R1, R2 to the input voltage of said central processor.

Said convertor comprises three resistors R3, R4, R5 and one triode G; wherein one end of resistor R3 is used as the input end of said convertor and the other end is connected to resistor R4 and base of said triode G, and the other end of resistor R4 is earthed; wherein emitter of said triode G is connected to one end of resistor R5 and used as output end of said convertor, collector of said triode G is earthed, and the other end of resistor R5 is connected to convertor power supply.

Said resistor R4 and said triode G in said convertor can be replaced by optic couplers for isolation between strong power source and the central processor.

Figure 5:
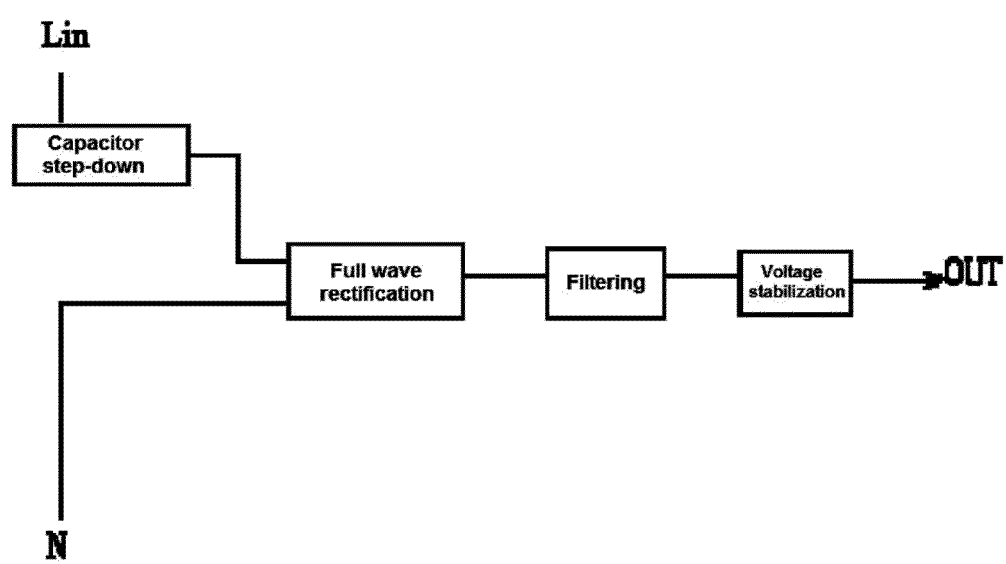
FIG. 5 is a schematic of the power supply circuit of this invention.

Refer to FIG. 2, FIG. 3, and FIG. 5. A power supply module is provided to supply power to circuit or module in said casing. Said power supply module is connected to commercial power live wire Lin via lead wire 12. Said power supply module comprises a capacitor step-down module, a full wave rectification module, a filtering module, and a voltage stabilization module; said capacitor step-down module realizes connection to commercial power live wire via current limiting; and said full wave rectification module can increase the current to reduce volume of the HV capacitor in said capacitor step-down module, so as to realize installation of power supply in the narrow space of existing low voltage one-pole (1P) miniature circuit breaker.

In addition to the above preferred embodiment, this invention may have other implementation modes. All technical schemes that adopt equivalent replacement or equivalent transformation shall fall within scope of protection requested by this invention.

What is claimed is:

1. An intelligent magnetic-hold miniature circuit breaker, comprising a casing, a magnetic-hold relay, a drive circuit, a central processor, a communication chip, a mutual inductance module, and a current conditioning circuit, said drive circuit being in communication with said magnetic-hold relay which comprises a dynamic spring assembly having an extension wire, a static spring assembly, a deflector rod, a pushing piece, and a magnetic steel assembly, said communication chip being connected to said central processor which is connected to said drive circuit to transmit control signals to said drive circuit, said mutual inductance module being installed on said extension wire of said dynamic spring assembly, said current conditioning circuit being connected to said central processor and said mutual inductance module, and said magnetic-hold relay being controlled by said central processor via said drive circuit according to current state signals received from said current conditioning circuit to realize overload protection.

2. The intelligent magnetic-hold miniature circuit breaker according to claim 1, wherein said mutual inductance module is a current transformer, Hall element, or manganese-copper resistor.

3. The intelligent magnetic-hold miniature circuit breaker according to claim 1, wherein said current conditioning circuit has a resistance network to process output current signals of said mutual inductance module into ADC voltage signals as input to said central processor.

4. The intelligent magnetic-hold miniature circuit breaker according to claim 1, further comprising a voltage state circuit having a first end and a second end, said first end being connected to said extension wire of said dynamic spring assembly and said second end being connected to said central processor for transmitting operating state signals of said magnetic-hold relay to said central processor; and said deflector rod extends out through a hole on said casing to allow manual operation.

5. The intelligent magnetic-hold miniature circuit breaker according to claim 4, wherein said deflector rod extends out through a hole on said casing to allow manual operation.

6. The intelligent magnetic-hold miniature circuit breaker according to claim 4, wherein said operating state signal is a voltage signal, and said voltage state circuit comprises a first resistor and second resistor, each having a first end and second end, and one convertor having an input end and an output end, said first end of said first resistor being connected to a power supply and its second end being connected to said first end of said second resistor and said input end of said convertor, said second end of said second resistor being earthed, and said output end of said convertor being connected to said central processor and converting voltage generated by voltage division of said two resistors to input voltage of said central processor.

7. The intelligent magnetic-hold miniature circuit breaker according to claim 6, wherein said convertor further comprises a resistor and one triode havid a base, an emitter and a collector, said first end of said first resistor is used as an input end and said second end is connected to said first end of said second resistor and said base of said triode, said second end of said second resistor is earthed, said emitter of said triode is connected to a first end of said third resistor and used as an output end of said convertor, said collector of said triode is earthed, and a second end of said third resistor is connected to a power supply.

8. The intelligent magnetic-hold miniature circuit breaker according to claim 7, wherein said second resistor and said triode in said convertor is replaced with optic couplers for isolation between a strong power source and said central processor.

9. The intelligent magnetic-hold miniature circuit breaker according to claim 1, further comprising a power supply module for supplying power to circuits or modules in said casing.

10. The intelligent magnetic-hold miniature circuit breaker according to claim 9, wherein said power supply module comprises a capacitor step-down module, a full wave rectification module, a filtering module, and a voltage stabilization module.

* * * * *